United States Patent
Fishhaut et al.

(10) Patent No.: US 7,334,016 B2
(45) Date of Patent: Feb. 19, 2008

(54) DATA TRANSFER SYSTEM FOR PROVIDING NON-BUFFERED, REAL-TIME STREAMING DATA USERS

(75) Inventors: Eric J. Fishhaut, Highland Park, IL (US); Robert M. Sawyer, Chicago, IL (US)

(73) Assignee: Globalview Software Inc., Chicago, IL (US)

( * ) Notice: Subject to any disclaimer, the term of this patent is extended or adjusted under 35 U.S.C. 154(b) by 1020 days.

(21) Appl. No.: 10/293,956

(22) Filed: Nov. 13, 2002

(65) Prior Publication Data
US 2004/0024845 A1 Feb. 5, 2004

Related U.S. Application Data

(60) Provisional application No. 60/335,904, filed on Nov. 15, 2001.

(51) Int. Cl.
*G06F 13/00* (2006.01)

(52) U.S. Cl. .................................................. 709/203
(58) Field of Classification Search .................. None
See application file for complete search history.

(56) References Cited

U.S. PATENT DOCUMENTS

| 6,085,252 A | 7/2000 | Zhu et al. |
|---|---|---|
| 6,195,680 B1 | 2/2001 | Goldszmidt et al. |
| 2003/0004853 A1* | 1/2003 | Ram et al. ................ 705/37 |

* cited by examiner

*Primary Examiner*—Robert B. Harrell
(74) *Attorney, Agent, or Firm*—Brinks Hofer Gilson & Lione

(57) ABSTRACT

A system is described for transferring and displaying data over a network. The system includes a client and a server. The client includes a client application to operate in a network environment. The server includes a server application to provide streaming data, snapshot data and historical data via the network. The client application and the server application maintain a connection to each other. The client application provides a plurality of interactive data display, manipulation components, and screen layout preferences.

20 Claims, 3 Drawing Sheets

DATA TRANSFER SYSTEM FOR PROVIDING NON-BUFFERED, REAL-TIME STREAMING DATA USERS

RELATED APPLICATIONS

This application claims priority as a continuation to the earlier filed Provisional U.S. Patent Application Ser. No. 60/335,904, filed Nov. 15, 2001, entitled "DATA TRANSFER SOFTWARE, SIGNALS, APPARATUS AND METHOD," which is incorporated by reference herein.

BACKGROUND

This application relates generally to software, signals, apparatus and methods involved in transferring and display of non-buffered streaming data over a network and, in particular, to software, signals, systems, apparatus, and methods for transferring data over the Internet where the data is obtained from multiple servers of various types, and more particularly related to software, signals, systems, apparatus, and methods utilizing a browser based desktop framework based on open standards and associated user configurable components.

Networks, especially the Internet, are often utilized to obtain or provide information to a user that is remote from the location where the data is stored. However, many current systems and apparatus do not operate as efficiently as they could and are constrained by a single database for the information that is provided. Additionally, most so-called streaming data consists of files that must be buffered when the file is "streamed" to a requestor. Furthermore, the same files are "streamed" to multiple users with very little room to customize the data stream for each user.

BRIEF SUMMARY OF THE INVENTION

This application discloses apparatus, software, signals, systems and methods that can avoid some of the disadvantages of prior apparatuses, software, signals, systems, and methods while affording additional structural and operating advantages.

One aspect is the provision of an improved information distribution apparatus, software, signals, system and method which offers the ability to distribute data from a variety of databases, servers and types of servers at the same time.

Another aspect is the provision of an information distribution apparatus, software, signals, system and method of the type set forth, wherein bi-directional and streaming data is provided in real time and delays are minimized and can be limited to network latency.

The above and other aspects are achieved by providing a system that can simultaneously provide different customized blocks of data to different users, based upon each user's specific request for data. The customized blocks of data can comprise data provided by one or more servers from a plurality of different servers and different types of servers. The data blocks can include data files, historical data, archived data, real-time data, non-buffered streaming data, and other types of suitable data such as transactions. Data can be provided as both request/responses as well as publish/subscribe allowing for both snapshot in time requests and ongoing real time streaming. The data blocks can even include combinations of different types of data, including numeric price data, text based news data, and graphical data such as adobe PDF documents or weather maps, from different servers and different types of servers.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
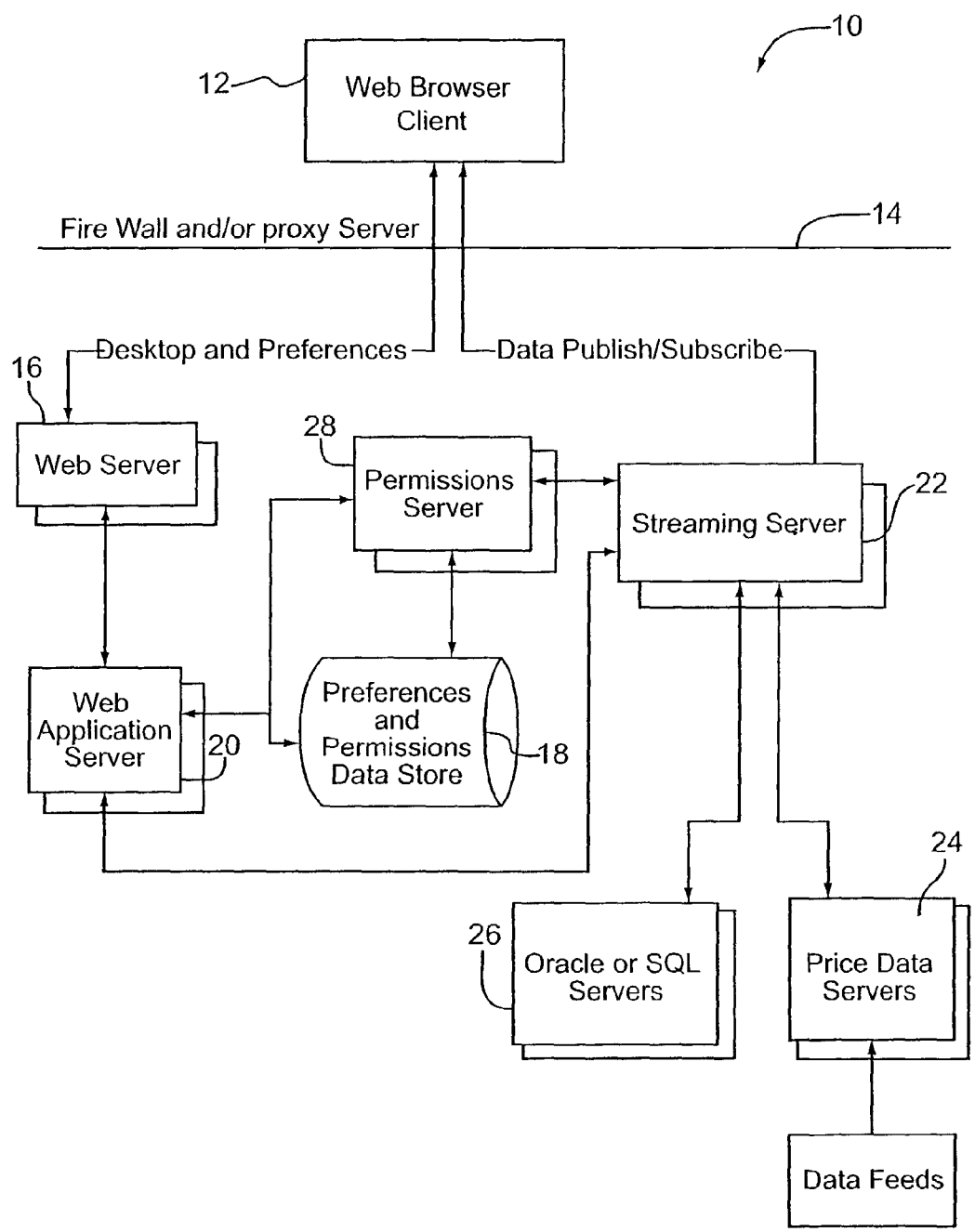
FIG. 1 is a diagrammatic representation of a system and software for providing customized non-buffered streaming data to a user.

Referring to FIG. 1, there is shown a simplified diagrammatic illustration of a system for transmitting data, generally designated by the numeral 10. The system 10 can include computers, databases and networks, including intranets, the Internet, and virtual private networks. In one form, an end user or client application, such as browser 12, resides on a client's or end user's computer that is networked to a server through an intranet. Browser 12 can be an Internet-type browser, such as NETSCAPE, MICROSOFT'S INTERNET EXPLORER, MOSAIC, or any other suitable browser. Browser 12 can access a network, such as an intranet, a virtual private network, or the Internet and may have to go through a proxy server or firewall 14 in order to connect to the Internet or another network.

Browser 12 can be used to access web server 16 that includes the URL for the application which is downloaded to a user's browser that can provide real-time streaming data without requiring any buffering of the data and bidirectional data messaging. Web server 16 can include a sign-on procedure for entering a user i.d. and password in order to access data. Web server 16 can also be used to access a preferences and permissions database 18, such as through application server 20. Application server 20 can be any suitable server, such as a J2EE compliant server such as Web Logic. Preferences and permissions database 18 is used to determine, keep track of, maintain and duplicate the screen layout preferences previously utilized by the client or end user and can provide detailed real time permissions for accessing both software functionality and data.

In one form, the client or user can store one or more screen layout preferences, such as what information is displayed and how it is displayed, to preferences and permissions database 18 and select from among such stored preferences. Additionally, one or more pre-stored preferences may be provided for each particular client or for all clients and end users to easily enable new users to become familiar with the system. Preferences and permissions database 18 can also be used to determine whether the client or end user still maintains permission to access the requested information or data.

In one form, historical information and/or data files are retrieved by application server 20 and sent to the client or end user for display on web browser 12. Additionally, a snapshot of current information can be retrieved by application server 20, from streaming server 22, and then sent to web browser 12 for display. In one form, if non-buffered real-time streaming data is requested by the user's stored preferences, or by a new request, then a connection is established between web browser 12 and streaming server 22 and current non-buffered real-time data is streamed from server 22 to browser 12.

Streaming server 22 can access multiple servers and multiple types of servers 24, 26 that contain data in a variety of formats and can be used to transfer various types of data, including encrypted data, from different servers 24, 26. In one form, streaming server 22 accesses permission server 28 that utilizes preferences and permissions database 18 to determine if the client or end user has permission to receive the requested data. The permission server 28 and preferences and permissions database 18 can even be used to determine if the client or end user has permission to receive the requested data on each occasion where the user makes a request for new data and can also be used throughout the period that the user is receiving streaming data. For example, if the user requests information concerning stock ticker SPY, the permission server and database can be used to determine whether the user is allowed to receive information concerning the requested stock ticker. When the user requests information concerning another stock ticker, such as BA, the permission server and permission database can be used to determine whether the client or end user has permission to receive data concerning the stock ticker BA.

In use, a user or client makes a request for data through browser 12. If the request is for historical data, the responsive data can be provided through web server 16 or directly from streaming server 22. Non-buffered streaming data (real-time or delayed) requests are processed from streaming server 22. For example, if real-time or delayed non-buffered streaming data concerning trades for the stock ticker SPY is requested, then streaming server 22 treats the request like a subscription asking for constantly updated trading information concerning the stock ticker SPY. Because certain trading information, such as prices, do not need to be updated unless a change occurs, streaming server 22 can be more efficient by treating the request like a subscription asking for only trading information that has changed. The streaming server 22 will only send updates when necessary to optimize both bandwidth usage and server performance. As soon as streaming server 22 receives the requested data, it responds with current data and determines when the requested data, or a portion thereof, has changed and publishes or otherwise sends any changed data to web browser 12. Because there can be delays between each packet of information sent by real-time streaming server 22 to web browser 12, a pulse or heartbeat is maintained between server 22 and the client's or user's computer to maintain the Internet connection through firewall and/or proxy server 14.

Streaming server 22 can also obtain historical information requested by the end user or client from one of the data servers 24, 26 that server 22 has access to. Additionally, streaming server 22 keeps track of all of the subscriptions for real-time streaming data that are requested by the client or end user and listens for data (that is related to the subscription request) from data servers 24, 26 that it is connected to. For example, real-time streaming server 22 listens to data concerning trades or news items related to a variety of stock ticker symbols and news sources, picks out data relating to the requested symbols that are being subscribed to, and publishes or otherwise forwards the data to each user's browser 12 that requested or subscribed to the specific data. In one form, the data is published without requiring buffering.

Figure 2:
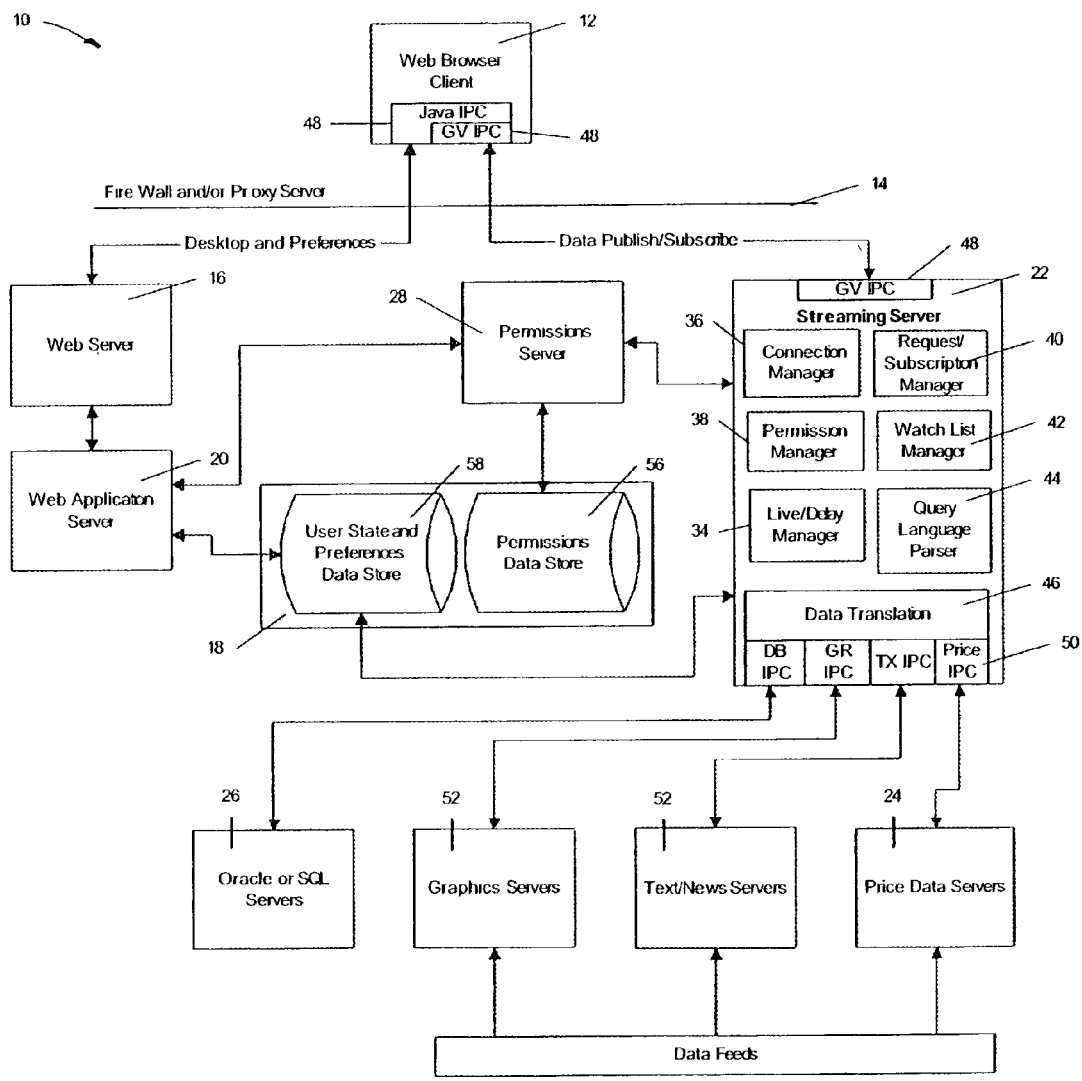
FIG. 2 is a more detailed diagrammatic illustration of the system of FIG. 1.

Referring to FIG. 2, there is shown a more detailed diagrammatic illustration of a system for transmitting data 10. In one form the user activates browser 12 on a desktop computer and communicates with web server 16 through firewall 14 that is installed on an intranet or Internet server coupled to the user's computer. Web server 16 includes the uniform resource locator (URL) to access the application and the appropriate database. Web server 16 can include a sign-on procedure using an account number, user id, and passwords to access the system. In one form, web server 16 is accessed and then a primary or direct connection 30 is provided to the real-time streaming server 22. Streaming server 22, can include a plurality of inter-process communication (IPC) programming components to allow streaming server 22 to communicate with multiple clients or users 12 and multiple servers 24, 26, 52 and multiple types of servers 24, 26, 52 so that data can be obtained from multiple data sources, providers and back ends.

Streaming server 22 can also process real-time streaming data and bi-directional data messages. Messages can be processed in real-time and concurrently (simultaneously) up to the number of CPU's by utilization of multiple threads. Messages can be prioritized and processed in priority order when simultaneous message receipts exceed the number of available CPU's. Messages can also be processed in the proper sequence where out-of-order execution would produce incorrect results.

Streaming server 22 can also include a number of components that help manage obtaining and distribution of non-buffered real-time streaming data and bi-directional data message routing and pass through. Live/delay manager 34 can manage the client and whether the client or user receives live or delayed data. Connection manager 36 can manage the client and the type of connection between the client and streaming server 22. For example, connection manager 36 manages the connection to the particular client or end user and makes sure the connection is maintained through the use of a pulse or heartbeat. Connection manager 36 also determines the path of least resistance to the client and will communicate through a specific port or tunnel through a specific port if necessary. Permission manager 38, using Permission Server 28, can make sure that the client or end user has permission for each type of data or group of data that is requested by the client or end user every time any new data is requested. In other words, the permission manager 38 does not just give permission to enter a specific database or section of database. Instead, it is used to make sure that each stock symbol or other data that is requested can be accessed by the client according to his subscription agreement, other agreement or other permission information.

Request/subscription manager 40 and watch list manager 42 can maintain a memory of what each client or end user are watching and can act as a data broker between clients and data servers to provide each client or end user with the data requested by that particular client or end user. In other words, watch list manager 42 keeps track of and maintains what data or other information needs to be watched for because it has been subscribed to by at least one client or end user. Together, request/subscription manager 40 and watch list manager 42 act as a data broker to send the requested data from the data servers to each of the one or more clients or end users that have requested such data. The query language parser 44 and data translation interface wrapper 46 can communicate with the GV data server 24 which is a server that obtains data from other servers. Additional language parsers and application program interfaces can be added to the streaming server 22 to communicate with additional types of data servers.

Streaming server 22 can also include one or more inter-process communication components 50 of various types to allow communication between streaming server 22 and multiple numbers and types of servers 24, 26 and other computers. Streaming server 22 can also include one or more other application program interfaces 50 to interact with one or more file systems 52, such as a Windows NT file system that contains fixed news pages, graphical documents or weather images, or historical data. Messages can be routed to dynamically loaded components described by the server configuration.

Permission server 28 and preferences and permissions database 18 can be linked to streaming server 22 through the permission manager 38 to determine whether each piece of data requested by the client or end user is within the type of data that is allowed to be accessed by that particular client or end user according to the terms of its subscription agreement or other-type agreement. Preferences and permissions database 18 can be part of a single database or separated into a permission database 56 and a preferences database 58. In one form, permission database 56 and preferences database 58 are located on the same server running a database manager system such as Oracle or SQL Server.

Permission server 28 and permission database 56 are used to determine whether the user is allowed access to particular data for each stock ticker, or other identifying information requested. For example, if the user requests historical information concerning the stock ticker SPY, then permission server 28 and permission database 56 are used to determine whether the user can have access to historical data for the stock ticker SPY. If the user asks for non-buffered real-time (or delayed) trading data for the stock ticker SPY, then permission server 28 and permission database 56 are used to determine whether the user is allowed access to non-buffered real-time (or delayed) trading data for the stock ticker SPY. The same procedure can occur for each new request concerning other stock ticker symbols or type of data requested.

If the user is allowed access to data for real-time (or delayed) information concerning a particular stock ticker, such as SPY, then streaming server 22 treats the request as a subscription and publishes the appropriate data to web browser 12 until the connection with the user's computer is lost, the user changes his request (i.e., unsubscribes or unadvises) so that he no longer requests such information, or until the permission server 28 is notified that the user no longer has access to such information. In each of these cases, the information will no longer be published to the user's web browser 12. This allows the provider to notify the permission server 28 when the user has canceled his agreement in order to prevent the user or client from making a subscription-type request, canceling their service agreement, maintaining a connection with streaming server 22, and continuing to receive "publications" for the old subscription-type request. In the case where the connection is lost, the client or user will initiate the re-connection process.

Application server 20, a J2EE compliant server, can be used to send non-streaming data indirectly to the client or end user instead of more directly from real-time streaming server 22. However, real-time streaming server 22 can also be used to send historical, non-streaming and real-time streaming data to the client or end user. This approach is used for clients who do not receive, due to software or data permissions, real time streaming data.

Figure 3:
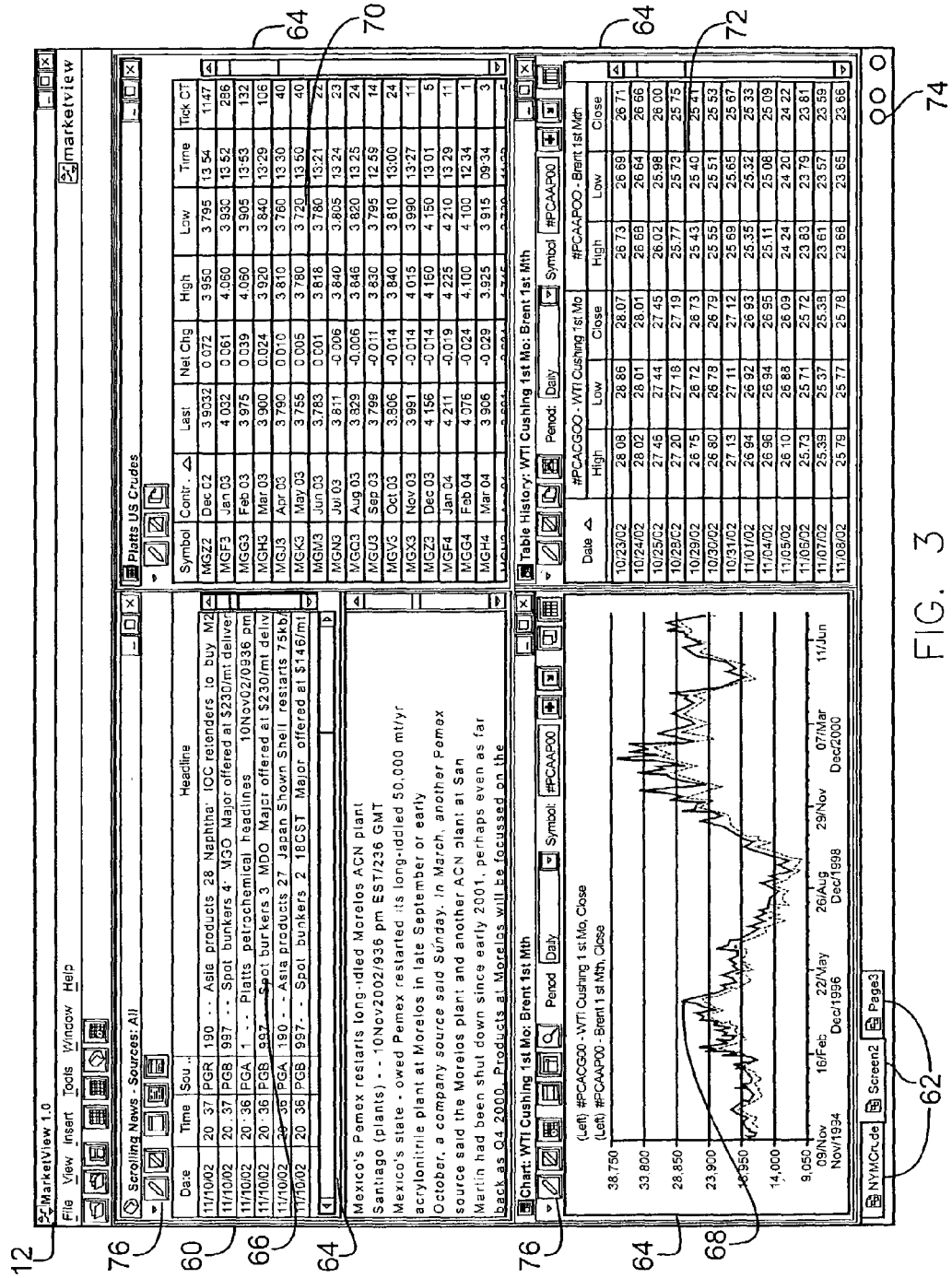
FIG. 3 is one example of a webpage provided to the user of the web browser in FIGS. 1 and 2.

Referring to FIG. 3, there is shown browser 12 having a web page 60 showing a variety of components requested by an end user. In one form, a tab metaphor is used to select from a series of pages to view. A user can create, delete and manage multiple pages 60 through the page manager accessed from the main menu. For example, each customized user page is associated with one of tabs 62 and the user can move from page to page by clicking on the different tab 62 associated with different pages. In one form, a portal framework 64 is used so that various components 66, 68, 70, 72 can be viewed, arranged, and configured on the same page.

For example, one or more components can be a time-line chart 68 showing the historical prices and the current price of a particular ticker symbol. Another component may include a tabular chart 72 having information relating to multiple stock symbols, such as the ticker symbol, the last price, a change in price since the last trade and other information requested by the client or user.

In one form, information for each component 66-72 of each page identified by tab 62 is updated even when not in view, so that as the user moves to each tabbed page, any delay in viewing updated information on the selected tabbed page is minimized. Additionally, each of the components 66-72 for each page 60 can be in separate configurable frames 64 that simulate a "window" that can be sized by the user. Each frame 64 can even have its own menu and tool bar 76 to allow for the easy manipulation of separate frames 64 and components 66-72 by the client or user.

Browser 12 and streaming server 22 maintain a live connection through a heartbeat or pulse and if the connection terminates, the absence of the heartbeat or pulse is recognized and browser 12 attempts to re-establish the connection to server 22. In one form, the user can use the preferences database 58 to select how long to wait without detecting a heartbeat before trying to re-establish a connection.

Additionally, since prices for ticker symbols can remain constant for periods of time, a visual indication 74 can be provided to show that the connection is being maintained and data is being received, that there is some problem in obtaining the requested data even though the connection with the real-time server has not been interrupted, or the connection is lost. For example, a series of colors like green, yellow and red can be used. For streaming data (both real-time and delayed), a visual indication can be provided for a new price change (such as the price in white). After momentarily appearing in white, the change in price can then be changed to green to show the price has increased or to red to indicate the price has decreased.

In one form, the portal framework supports JAVA, HTML, DHTML, ASP, JSP, and Active X components, in order to create an open standard. The framework provides common functionality for hosted components, including server and intra-component messaging that allows a symbol from one frame or component, such as a chart, to be linked into a second frame or component, such as a chart, so that the chart recognizes the symbol as a request to show a chart for the indicated symbol. This common functionality can be fully utilized by components so that all communication between the streaming server 22 and preferences database 58, accessed via the application server 20, are handled by the framework communications manager and not the component. In addition, the framework manages all display, navigation, and state management functionality.

In one form, there is zero footprint on the computer of the client or user. As used here, zero footprint can mean that there is no program installed on the client or user's computer, except for what is stored in the user's cache (such as a persistent cache). The framework can run in a browser and is preferably browser independent. However, tests and revisions need to be performed to make sure the system works with new browsers or browsers that it has not previously been tested on.

In use, multiple users or clients can each be connected to streaming server 22 and can each request different data for different, or the same, ticker symbols, etc. with each end user or client receiving data, from streaming server 22, that is customized for the client's or end user's particular request. The streaming server 22 uses IO completion ports that utilize multiple CPU's to allow streaming server 22 to provide historical and non-buffered streaming data based on different requests from multiple clients and end users in a highly scalable fashion.

For example, one user may request historical information concerning the stock tickers SPY and BA, a second user may request information concerning a completely different set of stock ticker symbols, and a third or nth user may request information concerning a group of stock symbols that have some symbols in common with those requested by other users. The multiple CPU's utilizing IO completion ports of server 22 allows multiple requests from users to be divided among the multiple CPU's so that the users can each obtain the requested data in an efficient manner from server 22. This allows the streaming server 22 to maintain many connections and efficiently respond to each as needed. It also provides scalability since the streaming server 22 will utilize additional CPUs to handle additional connected users and/or greater data volume.

Each client or end user may be using multiple pages 60 and multiple frames 64, some of which may include requests for subscriptions for the same stock ticker, or other information, as others of the pages 60 or component frames 64. The client framework, specifically the communication manager, aggregates these requests so that duplicate data is not requested and therefore not transmitted back to the client. In turn, the subscription manager 40 and watch list manager 42 perform a similar function in aggregating all requests from connected users back to the data servers 24, 26, and 52. In this manner, bandwidth and server processing is optimized by non-duplication of data because the data is not separately sent from the data servers 24, 26, and 52 to the streaming server 22 and from the streaming server 22 to each individual component within the framework for which it was requested.

To further optimize bandwidth and processing efficiency data packets are structured in a highly optimized format. One type of data packet is particularly useful for historical data or archived data that is used to make charts, graphs, etc. This data packet can include the a stock symbol, such as IBM, in the header or another portion of the data packet and then data representing a high on one date, followed by a high on a second date, followed by a high on an nth date, then a low on a first date, followed by a low on a second date, followed by a low on an nth date, followed by a close on a first date, a close on a second date, and a close on an nth date. In this manner, the data representing the IBM symbol, itself, does not need to be repeated.

Additionally, data packets representing historical data for more than one stock ticker can also be combined into a data packet having a header that indicates a first stock symbol, a second stock symbol, an nth stock symbol, and then followed by the type of information being sent for each such as high, low, and close. The header can also include the type of information provided for each symbol, such as high, low and close data. The header can then be followed by the high, low, and close data for requested periods for the first stock, followed by the high, low and close data for requested periods of the second stock, followed by high, low and close symbols for the requested periods of an nth stock. In this form, the header can also contain the length of each field for each stock requested to enable the information to be properly interpreted.

Historical-type or archived-type data is stored in a memory accessible by streaming server 22 and, in one form, a certain amount of memory is allocated for storing historical information related to each stock. In this case, the historical or archived-type information can include a header that indicates a capacity size for indicating the amount of memory allotted for the historical data and an indication of the actual size of the historical data stored in the allotted amount of memory. The actual size of the data stored for the historical information is always less than, or equal to, the memory allotted. Allocating more memory than necessary allows additional data to be added to the stored historical information without any fear of unnecessarily allocating and reallocating memory. When the allotted size of the memory is used up, or is approached, the allotted amount is increased and the historical data is re-saved to a larger newly allotted portion of the memory. It should be noted that while the allotted size is used for allocating storage in the memory, at most, only the actual amount of stored data is sent to the browser 12.

In a situation where a person requests and subscribes to non-buffered real-time (or delayed) streaming data concerning one or more stock ticker symbols, the data packet takes the form of stock symbol 1, stock symbol 2, stock symbol "n" followed by data for stock symbol 1, data for stock symbol 2, data for stock symbol "n". If there is no change in the stock symbol, then no data is sent. Therefore, in many instances, such data packets will vary in size over time according to the number of symbols for which non-buffered real-time data is requested and the number of symbols associated with a price change.

Each of the types of data packets can also include one or more identification numbers identifying one or more different conversations so that multiple requests for data can be made using a single connection between streaming server 22 and the end user or client. This allows the client to make multiple requests in various component frames and pages without having to send the information multiple times. In one form, the header contains multiple identification numbers to identify a single data packet that is responsive to more than one request.

The following are some examples of packets of data that might be used. A condensed data format describes a condensed block of data in memory that consists of a header record followed by a list of data records. The header record is defined by a structure. FIELD or VECTOR structures define the data records. When prices are represented in condensed blocks of data, they can be represented in a data format called a "Packed Long". A Packed Long can contain two values, a character value called the "Base Code" which indicates a tick size, and a long value representing the price as a number of ticks. Because financial instruments trade in multiples of some tick size, the format does not lose any information, and it eliminates the rounding errors, which might be encountered with floating-point data types.

The condensed data format describes a table, rearranged so that each cell is lined up in a list. A table which looks like:
"IBM" 57½
"GM" 50
"MSFT" 55³⁄₁₆ could be rearranged when it is represented as a condensed data block:

Header: "IBM" 57½ "GM" 50 "MSFT" 55³⁄₁₆, records=3, fields =2

The GV5 data block is the primary means of transmitting market data, user profile, and other information between clients and servers. GV5 is platform-neutral and self-describing yet makes efficient use of bandwidth. The header record at the beginning of each block is a structure that describes a square table of data with records rows and fields columns. In an actual block of data, all the data records are lined up end to end in a long list, so the header record provides the only indication of the number of rows and columns in the table. The header could look like this:

| Field | Data Type | Comments |
|---|---|---|
| Total Size | Integer32 | Total size of the GV5 block, in bytes. This must always be a non-negative integer. |
| Records | Integer32 | Number of records in the block. This must always be a non-negative integer. |
| Fields | Integer16 | Number of fields in each record. This must always be a non-negative integer. |

Following the header is the first field. The number of fields in the GV5 block is always equal to Records times Fields. Each field length is variable, so direct, random access is not possible until the entire block has been parsed into memory.

Each individual record in the list can be either a FIELD or a VECTOR. A FIELD contains a single value (e.g. Last Trade Price). A VECTOR can contain many values (e.g. all Trade Prices for IBM on July 12). Examples of the different kinds of FIELD and VECTOR records are listed below. The FIELD and VECTOR records are introduced using two specific examples: a PRICE_FIELD, containing a base code and a long integer, and a PRICE_VECTOR, containing a base code and list of long integers.

Note that FIELD and VECTOR records can be interspersed within a data block. For example, if you ask for a list of historical prices for IBM, GM, and MSFT, you will get a data block with 3 rows. Each row will contain the symbol name (a STRING field) and a list of prices (a packed long VECTOR).

One example FIELD structure is a PRICE_FIELD:
GV5_PRICE

When prices are transmitted in GV5 block, they are usually represented specifically as GV5_PRICE fields. Price fields contain a base code, which indicates a tick size, and a value representing the price as a number of ticks. Because financial instruments trade in multiples of the tick size, this format retains the price information without rounding errors that other data types can introduce. Negative values are not allowed in price fields.

The type of structure is contained in the first unsigned char of each FIELD or VECTOR structure in a member called fieldType. For a PRICE_FIELD, fieldType will be set to TYPE_PRICE. The fieldType variable comes at the beginning of a FIELD or VECTOR structure, in order to indicate how to interpret the data that follows. The last element of the PRICE_FIELD is the long integer value, following the Base Code. This element contains the actual data.

| Field | Data Type | Comments |
|---|---|---|
| Field Type | Byte | TYPE_PRICE |
| Base Code | Byte | |
| Value | Integer32 | Although signed, the value cannot be negative. |

A second example FIELD structure is a VECTOR PRICE_FIELD:
GV5_VECTOR_PRICE

If it is desirable to send several prices at one time, all associated with the same Field ID, a VECTOR could be used instead multiple PRICE fields. When prices are transmitted in GV5 vector block, they are usually represented as a list of PRICE fields. The block contains a base code, which indicates a tick size, and is followed by a list of price values.

| Field | Data Type | Comments |
|---|---|---|
| Field Type | Byte | TYPE VECTOR PRICE |
| Base Code | Byte | |
| Elements | Integer32 | Number of elements of the field type present. This must be a non-negative number |
| Values | Integer32 | Although signed, the value cannot be negative. |

Missing or Unchanged data may be indicated with an EMPTY_FIELD:

An ERROR_FIELD structure can be returned when no data is available for a particular field. The errCode parameter can contain more information about the cause of the error—i.e. why the data is not available.

Examples of data field structures, include the following:
GV5_EMPTY
Indicates that the particular value does not exist, or is NULL.
GV5_DOUBLE
GV5_INT16
GV5_INT32
GV5_INT64
GV5_BOOLEAN
GV5_PRICE64
This field is GV5_PRICE, except the value is a 64-bit integer to accommodate large tick values.
GV5_SHORTSTRING
Holds a string, which is a set of 8-bit characters. The string is limited in size to 32K.
GV5_LONGSTRING
Identical to GV5_SHORTSTRING but the string length can be of virtually any length.
GV5_DATE
Holds a date in a compact format with one byte for day, one byte for month and double byte for year.
GV5_TIME
Holds a time value in a compact format with a double byte for minutes and a byte for seconds.
GV5_BLOB
Holds a binary object of virtually any length.
The structure definitions for different data types can be similar to these.

In addition to the FIELD and VECTOR structures, which contain data, there are two special FIELDS called EMPTY and ERROR. ERROR FIELDS can also be included to be used to indicate data, which is not available for a particular request. EMPTY FIELDS may be used as placeholders in a data block when a particular column is not filled in some of the rows.

If multiple vectors for the same Field ID are received in a single response they are to be concatenated. The earliest data are always first. This may be necessary if a single VECTOR would span a 64K boundary.

It is therefore intended that the foregoing detailed description be regarded as illustrative rather than limiting, and that it be understood that it is the following claims, including all equivalents, that are intended to define the spirit and scope of this invention.

We claim:

1. A system for transferring and displaying data to a plurality of users on a network, comprising:
    a plurality of server modules including a server application to provide streaming data, snapshot data and historical data over the network, to provide controls for access permission of data features and software features to the plurality of users, to support a subscription of data updates, to maintain a management list of the plurality of users requests, and to maintain a watch list of data items requested by the plurality of users;
    wherein at least one of the plurality of servers comprise a streaming server including a plurality of processors, the plurality of processors to provide access to the plurality of servers, to provide non-buffered, substantially real-time streaming data to the plurality of clients upon requests from the plurality of clients;
    wherein at least one of the plurality of servers comprise a connection manager to provide connection services to the plurality of users;
    wherein at least one of the plurality of servers comprise a communication manager to maintain a connection between at least one of the plurality of servers and a client application; and
    wherein at least one of the plurality of servers comprises a permission server to validate access permission for data items requested by the plurality of users.

2. The system of claim 1 wherein a data packet sent between the client application and the server application is structured in an optimized format.

3. The system of claim 2 wherein the data packet can contain historical data for a variety of symbols.

4. The system of claim 2 wherein the data packet contains an identification number to identify different conversations.

5. The system of claim 2 wherein the data packets are processed in real-time.

6. The system of claim 2 wherein data packets are processed in priority order when simultaneous receipts exceed a number of available processors.

7. The system of claim 2 wherein data packets are processed in sequence when out-of-order execution produces an incorrect result.

8. The system of claim 2 wherein data packets are routed to dynamically loaded components.

9. The system of claim 1 wherein the plurality of servers are connectable to a preference and permissions database.

10. The system of claim 9 wherein the preference and permission database allows storage and retrieval of user preferences and screen layouts.

11. The system of claim 1 wherein the plurality of servers provide bi-directional message routing and pass-through capability.

12. The system of claim 1 wherein the plurality of servers support a variety of data requests and subscriptions.

13. The system of claim 1 wherein the plurality of servers translates data queries to specific format of a data server request.

14. A system for transferring and displaying data over a network, comprising:
    a plurality of clients including a client application to operate in the network;
    a plurality of information servers including server applications to provide non-buffered, substantially real-time streaming data via the network;
    wherein the client application and the server applications maintain a connection to each other; and
    a streaming server including a plurality of processors, the plurality of processors to provide access to the plurality of information servers, and to provide the non-buffered, substantially real-time streaming data to the plurality of clients upon requests from the plurality of clients.

15. The system of claim 14 wherein the client application provides a visual indication that the connection is being maintained between the client application and the server application.

16. The system of claim 14 wherein the client application provides a communication manager to communicate with the server application.

17. The system of claim 16 wherein the communication manager aggregates data requests and transfers data for a plurality of components.

18. The system of claim 14 wherein the client application provides a portal framework to support a variety of components that use a plurality of languages.

19. The system of claim 18 wherein a web server that includes a sign-on procedure for the client application.

20. The system of claim 14 wherein the client application provides a tab metaphor to allow navigation between multiple open pages.

* * * * *